(12) United States Patent
Pugh et al.

(10) Patent No.: US 9,049,314 B2
(45) Date of Patent: Jun. 2, 2015

(54) DYNAMICALLY AND CUSTOMIZABLY MANAGING DATA IN COMPLIANCE WITH PRIVACY AND SECURITY STANDARDS

(75) Inventors: Michael D. Pugh, Pueblo, CO (US);
David W. Collins, Scottsdale, AZ (US);
Richard S. Dick, Alpine, UT (US)

(73) Assignee: Verisma Systems, Inc., Salt Lake City, UT (US)

( * ) Notice: Subject to any disclaimer, the term of this patent is extended or adjusted under 35 U.S.C. 154(b) by 3079 days.

(21) Appl. No.: 11/057,097

(22) Filed: Feb. 12, 2005

(65) Prior Publication Data
US 2005/0192830 A1 Sep. 1, 2005

Related U.S. Application Data

(63) Continuation-in-part of application No. 10/294,156, filed on Nov. 13, 2002, now Pat. No. 7,191,463, which is a continuation-in-part of application No. 10/192,175, filed on Jul. 9, 2002, now Pat. No. 6,804,787.

(60) Provisional application No. 60/380,679, filed on May 15, 2002.

(51) Int. Cl.
| | | |
|---|---|---|
| G06Q 10/06 | (2012.01) | |
| G06Q 10/10 | (2012.01) | |
| G06Q 10/08 | (2012.01) | |
| G06Q 30/06 | (2012.01) | |
| H04N 1/00 | (2006.01) | |
| G06F 21/62 | (2013.01) | |
| G06Q 20/20 | (2012.01) | |

(52) U.S. Cl.
CPC ......... *H04N 1/00204* (2013.01); *G06Q 10/101* (2013.01); *G06F 21/6245* (2013.01); *G06Q 10/105* (2013.01); *G06Q 20/206* (2013.01); *H04N 2201/001* (2013.01); *H04N 2201/0093* (2013.01); *H04N 2201/3218* (2013.01)

(58) Field of Classification Search
USPC .............................. 705/1, 1.1–912; 713/168
See application file for complete search history.

(56) References Cited

U.S. PATENT DOCUMENTS

| | | | | |
|---|---|---|---|---|
| 5,715,403 | A * | 2/1998 | Stefik | 705/44 |
| 6,289,460 | B1 | 9/2001 | Hajmiragha | 713/200 |
| 2001/0041991 | A1 | 11/2001 | Segal et al. | 705/3 |
| 2001/0053986 | A1 | 12/2001 | Dick | 705/3 |
| 2002/0004727 | A1 | 1/2002 | Knaus et al. | 705/3 |
| 2002/0016923 | A1 | 2/2002 | Knaus et al. | 705/3 |
| 2002/0022975 | A1 | 2/2002 | Blasingame et al. | 705/3 |

(Continued)

*Primary Examiner* — Jonathan Ouellette
(74) *Attorney, Agent, or Firm* — Michael F. Krieger; Kirton McConkie

(57) ABSTRACT

Systems and methods for managing data in compliance with privacy, security and/or retention standards in business industries. A dynamic and customizable archival and retrieval system allows for information and documentation to be placed and made available in the system. The document type and identifying information for that document type are described. Definitions are established for the documents being managed, the data identifying the documents, and the retention policies for the documents. The documents are associated with the identifying data for a particular set of records. A single point of entry is provided for external and/or internal requests, and/or a single point of exit is provided for transmissions of information, wherein the transmissions to requestors include information that is individually approved. Moreover, digital authorizations and consents for retrieval from external data sources may be utilized.

5 Claims, 12 Drawing Sheets

(56) References Cited

U.S. PATENT DOCUMENTS

| | | | |
|---|---|---|---|
| 2002/0026328 A1 | 2/2002 | Westerkamp et al. | 705/2 |
| 2002/0029157 A1 | 3/2002 | Marchosky | 705/3 |
| 2002/0032583 A1 | 3/2002 | Joao | 705/2 |
| 2002/0116227 A1 | 8/2002 | Dick | 705/3 |
| 2002/0165736 A1 | 11/2002 | Tolle et al. | 705/3 |
| 2003/0046114 A1 | 3/2003 | Davies et al. | 705/3 |
| 2003/0050803 A1 | 3/2003 | Marchosky | 705/3 |
| 2004/0103000 A1 | 5/2004 | Owurowa et al. | 705/2 |
| 2004/0117215 A1 | 6/2004 | Marchosky | 705/3 |

* cited by examiner

DYNAMICALLY AND CUSTOMIZABLY MANAGING DATA IN COMPLIANCE WITH PRIVACY AND SECURITY STANDARDS

RELATED APPLICATIONS

This application is a continuation-in-part of U.S. patent application Ser. No. 10/294,156, filed Nov. 13, 2002 entitled MANAGING DATA IN COMPLIANCE WITH REGULATED PRIVACY, SECURITY, AND ELECTRONIC TRANSACTION STANDARDS, which is a continuation-in-part of U.S. patent application Ser. No. 10/192,175, filed Jul. 9, 2002 entitled MANAGING DATA IN COMPLIANCE WITH REGULATED PRIVACY, SECURITY, AND ELECTRONIC TRANSACTION STANDARDS, issued as U.S. Pat. No. 6,804,787, which claims priority to U.S. Provisional Patent Application Ser. No. 60/380,679 filed May 15, 2002, entitled MANAGING DATA IN COMPLIANCE WITH REGULATED PRIVACY, SECURITY, AND ELECTRONIC TRANSACTION STANDARDS.

BACKGROUND OF THE INVENTION

1. Field of the Invention

The present invention relates to information and document management. In particular, the present invention relates to systems and methods for managing data in compliance with privacy, security and/or retention standards in business industries.

2. Background and Related Art

Information management has become an important part of business in a variety of different business industries. By way of example, in the medical industry, information is gathered from patients, physician services, medical research, medical training, insurance policy underwriting, and the like. The medical information has proven to be beneficial to patients, physicians, other medical service providers, and other business entities. For example, insurance companies that provide life, health, disability income, long term care, casualty, and reinsurance policies routinely require medical information for analysis as to policy eligibility. Typically, the analysis of medical information includes reviewing such medical records as an attending physician's statement, which is considered to be a very reliable record as it contains analyses and conclusions by a licensed medical professional. Medical records are also used in determining the amount of risk presented by an individual for a policy, and in determining causation and other issues relevant to insurance claim adjusting.

Currently, medical records are generally available, but are not easily accessible because of the confidential nature of the information. Accordingly, the medical records are protected by established professional conduct and by enacted legislation requiring the patient's consent prior to disclosure of the medical record information. Further, a large majority of the medical record information is restricted to paper documentation that is located in the office file rooms of the medical service providers, restricting the sharing of information.

In order to prevent the expense of filling office space with voluminous records, some medical providers are migrating to electronic record systems, and are converting paper records to electronic records. However, like their paper counterparts, the electronic records typically remain isolated from external sources.

Currently, a delay is generally experienced when requesting information from a medical information repository, such as a physician's office. The delay is due to the paper-only format of the records, the need for personnel time to pull the records and provide the requestor with a copy thereof, and the low priority that is assigned to such requests by medical providers. Typically, the delay in underwriting insurance policies may cause applicants to lose interest, and cause a consequent loss of business to the insurer.

In an effort to shorten delays, some requesters utilize agents to travel to the various medical offices to manually retrieve copies of the medical records. Although this may partially accelerate the obtaining of the records, the cost in performing this service can be expensive and the technique does not address the problem of determining whether the retrieved record is complete, and whether other records exist. Moreover, even when the existence and location of a record are known, its relevance remains uncertain until retrieved and reviewed.

Health care providers and emergency medical technicians also have a need to access medical records. Health care providers and emergency medical technicians are typically required to make decisions regarding the care of a patient under circumstances in which paper records are unavailable. The inability of traditional techniques to provide medical record information to health care providers and emergency medical technicians increases the risk of improper treatment and the likelihood of medical malpractice.

A further complication in the providing of medical information to a particular requester lies in established regulations, such as the Health Insurance Portability and Accountability Act (HIPAA), which mandates regulations that govern privacy, security, and electronic transactions standards for health care information. The regulations require major changes in how health care organizations handle all facets of medical information management, including reimbursements, coding, security, and patient records. The regulations have a far-reaching impact on every department of every entity that provides or pays for health care.

For example, HIPAA requires that the medical entity enable patients to first view any and all patient-specific information that the entity may have concerning them, and that the medical entity enable patients to make annotations or comments pertinent to the information that the entity has provided. Further, patients may request that information be corrected. Accordingly, the entity is required to enable a patient-driven "editorial commenting" capability. While the medical entity is not necessarily obligated to make any actual "corrections" to their internal records, they are required to indicate that the patient has registered their comments or made certain suggested changes to their personal information.

Such requirements may generally be considered as a real detriment by many medical entities. Yet to others it represents an opportunity for the entity (e.g. a physician or others who may hold crucial clinical information, such as a prescription history) to document and publish the fact that the patient himself has actually viewed and verified as of a certain date the accuracy and completeness of their personal information that the entity has about them. In the case of retrieving and viewing a current prescription history, the patient-verified history would be very assuring to an emergency room physician who is treating the patient.

Accordingly, it would be an improvement in the art to enable affected entities to comply with privacy and security standards, including regulations that have been enacted, and to facilitate information management and exchange without breaching duties of confidentiality or professional relationships.

SUMMARY OF THE INVENTION

The present invention relates to information and document management. In particular, the present invention relates to systems and methods for managing data in compliance with privacy, security and/or retention standards in business industries.

Implementation of the present invention takes place in association with one or more computer devices that are used in a system to manage data in compliance with regulated and/or established privacy, security and/or electronic transaction standards. In one implementation, the system includes a single point of entry for external and/or internal requests, and/or a single point of exit for transmissions of information, wherein the transmissions include individually identifiable patient information to legitimate patient-approved requests.

A dynamic and customizable archival and retrieval system allows for information and documentation to be placed and made available in the system. In at least one implementation, the information and documentation is provided into the system in an identifiable form. The document type and key pieces of identifying information for that document type are described. Documents are provided. Definitions are established for the documents being managed, the data identifying the documents, and the retention policies for the documents. An input form is programmatically generated based on the identifying data, which is provided to the system. The documents to be managed are included into the system. For example, such documents are paper documents that are scanned, faxed, or read into the system for dynamic document management and storage. Other documents are electronic documents or information included into the system for dynamic document management and storage. The documents are associated with the identifying data for a particular set of records. In one implementation, the particular set of records creates a dynamic and customizable folder for archiving, managing and retrieving the documents corresponding to the dynamic folder. The managed documents and information are retrievable on a storage medium based on the defined retention policy and by searching the identifying data.

As mentioned above, implementation of the present invention embraces a fax machine that is configured to transmit and receive information for use in including documents into the dynamic and customizable archival and retrieval system. By way of example, a user, such as a physician or a representative of the physician, uses the fax machine to transmit a set of information, wherein the transmission set includes an information sheet having a bar code configured for scanning, an information sheet without a bar code, patient information, and an end of transmission sheet. The transmission set is provided to a server, which preserves the transmission set in a digital format and acknowledges receipt of the transmission set by sending to the fax machine a confirmation as to the receipt of the transmission set. The server preserves the digital copy of the transmission set for a period of time, such as for a period established by regulation (e.g., 6 years). The physician maintains the confirmation along with the transmission set in a file and can selectively obtain the digital copy of the transmission set from the server by utilizing an identifier associated with the transmission set. Accordingly, the fax machine is used to include data in the dynamic and customizable system for the management of information in compliance with regulated privacy, security, and electronic transaction standards.

Implementation of the present invention further embraces the de-identification of information that may be selectively used and/or sold. As an example, the de-identification prevents the identification of patients corresponding to the medical information, thus allowing the information to be useful while still preserving professional confidences. Moreover, implementation of the present invention embraces fully digital authorizations and consents for retrieval from external data sources.

While the methods and processes of the present invention have proven to be particularly useful in the area of managing medical information, those skilled in the art can appreciate that the methods and processes can be used in a variety of different applications and in a variety of different industries to manage information. Examples include the health care industry, the automobile industry, the real estate industry, the insurance industry, the financial industry, the energy and/or natural resources industry, the educational or academic industry, the gaming industry, the transportation industry, the manufacturing industry, the sales industry, and any other industry that is involved with document management and/or the managing of information.

These and other features and advantages of the present invention will be set forth or will become more fully apparent in the description that follows and in the appended claims. The features and advantages may be realized and obtained by means of the instruments and combinations particularly pointed out in the appended claims. Furthermore, the features and advantages of the invention may be learned by the practice of the invention or will be obvious from the description, as set forth hereinafter.

BRIEF DESCRIPTION OF THE DRAWINGS

In order that the manner in which the above recited and other features and advantages of the present invention are obtained, a more particular description of the invention will be rendered by reference to specific embodiments thereof, which are illustrated in the appended drawings. Understanding that the drawings depict only typical embodiments of the present invention and are not, therefore, to be considered as limiting the scope of the invention, the present invention will be described and explained with additional specificity and detail through the use of the accompanying drawings in which.

DETAILED DESCRIPTION OF THE INVENTION

Figure 1:
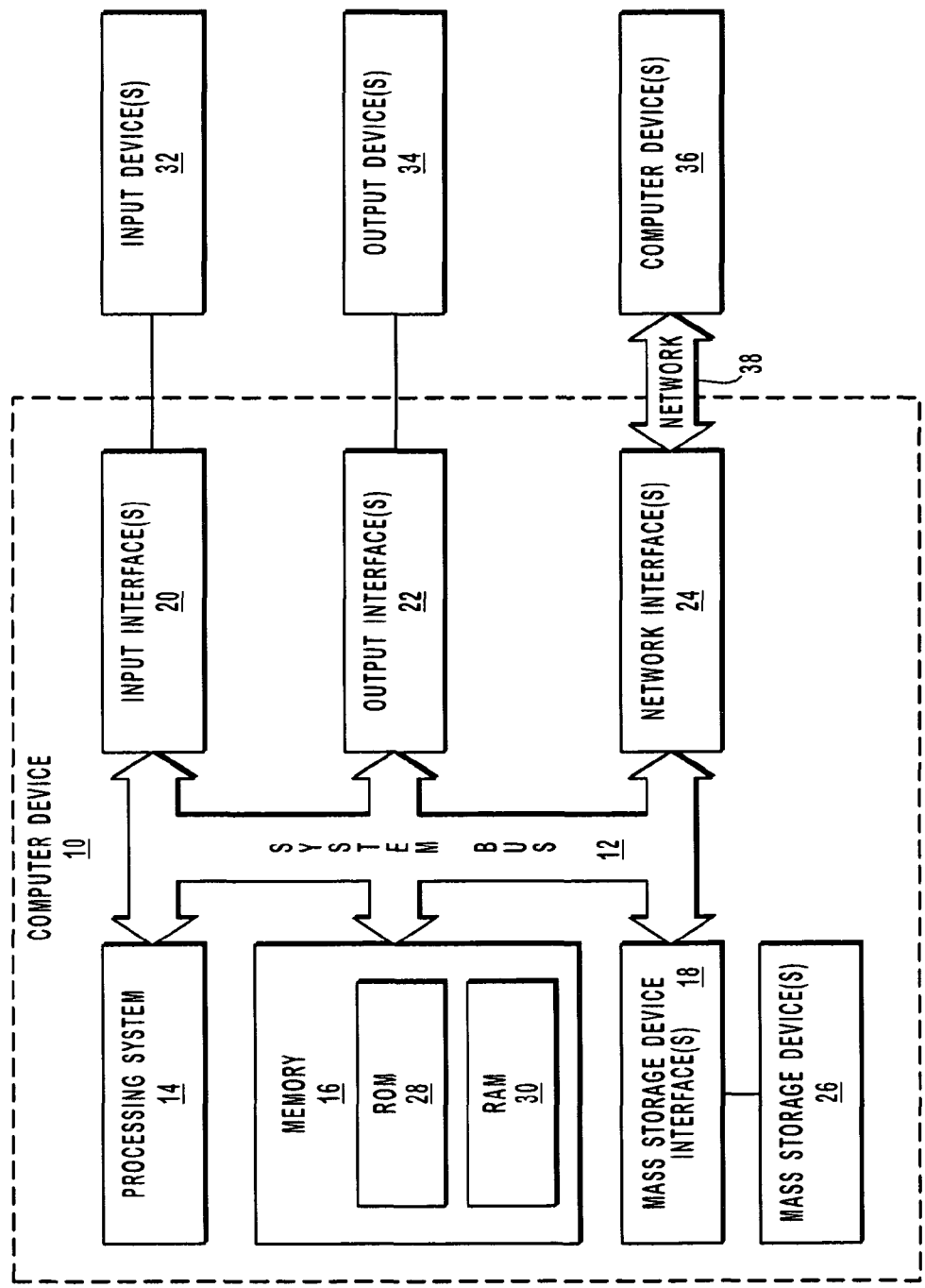
FIG. 1 illustrates a representative system that provides a suitable operating environment for use of the present invention, including document and data management in compliance with regulated privacy, security, and/or retention standards in accordance with an embodiment of the present invention.

The present invention relates to information and document management. In particular, the present invention relates to systems and methods for managing data in compliance with privacy, security and/or retention standards in business industries.

Embodiments of the present invention take place in association with one or more computer devices that are used in a dynamic and customizable archival and retrieval system to manage data in compliance with regulated privacy, security, and/or retention standards in business industries. The dynamic and customizable archival and retrieval system allows for information and documentation to be placed and made available in the system.

In one embodiment, the information and documentation that is to be dynamically managed is provided into the system in an identifiable form. The document type and key pieces of identifying information for that document type are described. Documents are provided. Definitions are established for the documents being managed, the data identifying the documents, and the retention policies for the documents. An input form is programmatically generated based on the identifying data, which is provided to the system. The paper documents to be managed are included into the system by being scanned, faxed, or read into the system for dynamic document management and storage. Electronic documents or information may also be included into the system for dynamic document management and storage. The documents are associated with the identifying data for a particular set of records. The managed documents and information are retrievable on a storage medium based on the defined retention policy and by searching the identifying data. In one embodiment, the particular set of records creates a dynamic and customizable folder for archiving, managing and retrieving the documents corresponding to the dynamic folder.

In one embodiment, the system includes a single point of entry for external and/or internal requests, and/or a single point of exit for transmissions of information, wherein the transmissions include individually identifiable patient information to legitimate patient-approved requests. Furthermore, embodiments of the present invention embrace fully digital authorizations and consents for retrieval from external data sources.

At least some embodiments of the present invention embrace the utilization of a fax machine to transmit or otherwise provide a set of information. In one embodiment, the transmission set includes an information sheet having a bar code configured for scanning, an information sheet without a bar code, patient information, and an end of transmission sheet. The transmission set is provided to a server, which preserves the transmission set in a digital format and acknowledges receipt of the transmission set by sending to the fax machine a confirmation as to the receipt of the transmission set. The server preserves the digital copy of the transmission set for a period of time, such as for a period established by regulation (e.g., 6 years). A physician maintains the confirmation along with the transmission set in a file and can selectively obtain the digital copy of the transmission set from the server by utilizing an identifier associated with the transmission set. Accordingly, the fax machine is used to manage data in compliance with regulated privacy, security, and electronic transaction standards.

At least some embodiments of the present invention embrace the de-identification of information that may be selectively used and/or sold. By way of example, the de-identification prevents the identification of patients corresponding to the medical information, thus allowing the information to be useful while still preserving professional confidences.

The following disclosure of the present invention is grouped into two subheadings, namely "Exemplary Operating Environment" and "Managing Data in Compliance with Business Standards." The utilization of the subheadings is for convenience of the reader only and is not to be construed as limiting in any sense.

Exemplary Operating Environment

FIG. 1 and the corresponding discussion are intended to provide a general description of a suitable operating environment in which embodiments of the invention may be implemented. One skilled in the art will appreciate that the invention may be practiced by one or more computing devices and in a variety of system configurations, including in a networked configuration.

Embodiments of the present invention embrace one or more computer readable media, wherein each medium may be configured to include or includes thereon data or computer executable instructions for manipulating data. The computer executable instructions include data structures, objects, programs, routines, or other program modules that may be accessed by a processing system, such as one associated with a general-purpose computer capable of performing various different functions or one associated with a special-purpose computer capable of performing a limited number of functions. Computer executable instructions cause the processing system to perform a particular function or group of functions and are examples of program code means for implementing steps for methods disclosed herein. Furthermore, a particular sequence of the executable instructions provides an example of corresponding acts that may be used to implement such steps. Examples of computer readable media include random-access memory ("RAM"), read-only memory ("ROM"), programmable read-only memory ("PROM"), erasable programmable read-only memory ("EPROM"), electrically erasable programmable read-only memory ("EEPROM"), compact disk read-only memory ("CD-ROM"), or any other device or component that is capable of providing data or executable instructions that may be accessed by a processing system.

With reference to FIG. 1, a representative system for implementing the invention includes computer device 10, which may be a general-purpose or special-purpose computer. For example, computer device 10 may be a personal computer, a notebook computer, a personal digital assistant ("PDA") or other hand-held device, a workstation, a minicomputer, a mainframe, a supercomputer, a multi-processor system, a network computer, a scanner or fax machine, a processor-based consumer electronic device, or the like.

Computer device 10 includes system bus 12, which may be configured to connect various components thereof and enables data to be exchanged between two or more components. System bus 12 may include one of a variety of bus structures including a memory bus or memory controller, a peripheral bus, or a local bus that uses any of a variety of bus architectures. Typical components connected by system bus 12 include processing system 14 and memory 16. Other components may include one or more mass storage device interfaces 18, input interfaces 20, output interfaces 22, and/or network interfaces 24, each of which will be discussed below.

Processing system 14 includes one or more processors, such as a central processor and optionally one or more other processors designed to perform a particular function or task. It is typically processing system 14 that executes the instructions provided on computer readable media, such as on memory 16, a magnetic hard disk, a removable magnetic disk, a magnetic cassette, an optical disk, or from a communication connection, which may also be viewed as a computer readable medium.

Memory 16 includes one or more computer readable media that may be configured to include or includes thereon data or instructions for manipulating data, and may be accessed by processing system 14 through system bus 12. Memory 16 may include, for example, ROM 28, used to permanently store information, and/or RAM 30, used to temporarily store information. ROM 28 may include a basic input/output system ("BIOS") having one or more routines that are used to establish communication, such as during start-up of computer device 10. RAM 30 may include one or more program modules, such as one or more operating systems, application programs, and/or program data.

One or more mass storage device interfaces 18 may be used to connect one or more mass storage devices 26 to system bus 12. The mass storage devices 26 may be incorporated into or may be peripheral to computer device 10 and allow computer device 10 to retain large amounts of data. Optionally, one or more of the mass storage devices 26 may be removable from computer device 10. Examples of mass storage devices include hard disk drives, magnetic disk drives, tape drives and optical disk drives. A mass storage device 26 may read from and/or write to a magnetic hard disk, a removable magnetic disk, a magnetic cassette, an optical disk, or another computer readable medium. Mass storage devices 26 and their corresponding computer readable media provide nonvolatile storage of data and/or executable instructions that may include one or more program modules such as an operating system, one or more application programs, other program modules, or program data. Such executable instructions are examples of program code means for implementing steps for methods disclosed herein.

One or more input interfaces 20 may be employed to enable a user to enter data and/or instructions to computer device 10 through one or more corresponding input devices 32. Examples of such input devices include a keyboard and alternate input devices, such as a mouse, trackball, light pen, stylus, or other pointing device, a microphone, a joystick, a game pad, a satellite dish, a scanner, a camcorder, a digital camera, and the like. Similarly, examples of input interfaces 20 that may be used to connect the input devices 32 to the system bus 12 include a serial port, a parallel port, a game port, a universal serial bus ("USB"), a firewire (IEEE 1394), or another interface.

One or more output interfaces 22 may be employed to connect one or more corresponding output devices 34 to system bus 12. Examples of output devices include a monitor or display screen, a speaker, a printer, and the like. A particular output device 34 may be integrated with or peripheral to computer device 10. Examples of output interfaces include a video adapter, an audio adapter, a parallel port, and the like.

One or more network interfaces 24 enable computer device 10 to exchange information with one or more other local or remote computer devices, illustrated as computer devices 36, via a network 38 that may include hardwired and/or wireless links. Examples of network interfaces include a network adapter for connection to a local area network ("LAN") or a modem, wireless link, or other adapter for connection to a wide area network ("WAN"), such as the Internet. The network interface 24 may be incorporated with or peripheral to computer device 10. In a networked system, accessible program modules or portions thereof may be stored in a remote memory storage device. Furthermore, in a networked system computer device 10 may participate in a distributed computing environment, where functions or tasks are performed by a plurality of networked computer devices.

As will be further discussed below, in at least some embodiments, computer device 10 receives requests to provide information to output device 34 or another computer device (e.g., computer device 36) from a dynamic and customizable document archival and retrieval system. The document information is preserved on a computer readable medium, such as mass storage device 26, that is internal to the computer device 10, a computer readable medium that is insertable into computer device 10 such as a DVD, CD or the like, or a computer readable medium that is external to computer device 10 and is readable through input interface 20.

The dynamic and customizable archival and retrieval system allows for information and documentation to be placed and made available in the system. As will be further discussed below, the information and documentation is provided into the system in an identifiable form. The document type and key pieces of identifying information for that document type are described. Definitions are established for the documents being managed, the data identifying the documents, and the retention policies for the documents. The documents are associated with the identifying data for a particular dynamic and customizable set of records. The managed documents and information are retrievable on a storage medium based on the defined retention policy and by searching the identifying data.

Figure 2:
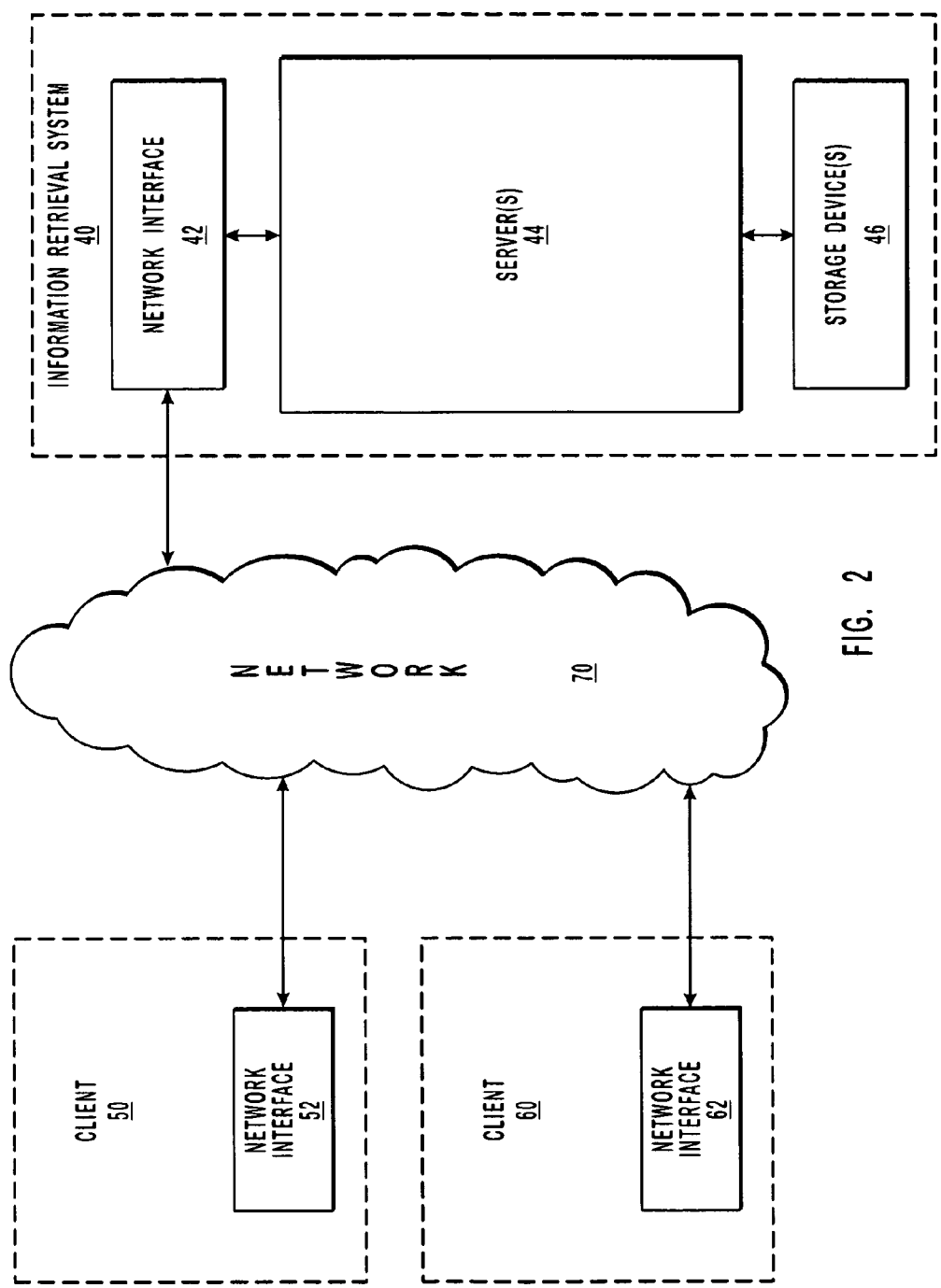
FIG. 2 illustrates a representative networked system that enables data management in compliance with regulated privacy, security, retention and/or electronic transaction standards in accordance with an embodiment of the present invention.

As mentioned herein, at least some embodiments embrace networked computer environments. And, while those skilled in the art will appreciate that the invention may be practiced in networked computing environments with many types of computer system configurations, FIG. 2 illustrates a representative embodiment of the present invention in a networked environment that includes clients connected to a server via a network. While FIG. 2 illustrates an embodiment that includes two clients connected to the network, alternative embodiments include one client connected to a network or many clients connected to a network. Moreover, embodiments in accordance with the present invention include a multitude of clients throughout the world connected to a network, where the network is a wide area network, such as the Internet.

In FIG. 2, clients 50 and 60 exchange information with information retrieval system 40 via network 70. Such information exchanges include the submission of a request for information by a client to the information retrieval system. Such requests may be in the form of electronic data. Network interfaces 42, 52, and 62 enable the exchange of information between clients 50 and 60 and information retrieval system 40, which includes servers 44 and storage devices 46. In the illustrated embodiment, servers 44 process the methods disclosed herein to respond to requests by clients 50 and 60 as to the obtaining of information, which is preserved at storage device(s) 46. Once the requested information is selectively obtained, a report is preserved by system 40 and a copy of the report is transmitted back to the requester in response to the request, as will be further discussed below.

Managing Data in Compliance with Business Standards

As discussed above, embodiments of the present invention take place in association with one or more computer devices that are used in a system to manage data in compliance with privacy, security and/or retention standards in business industries. Further, at least some embodiments of the present invention embrace a single point of entry for external and/or internal requests, and/or a single point of exit for transmissions of information.

While the following discussion relates utilization of the systems and methods of the present invention in the health care industry, those skilled in the art will appreciate that the systems and methods can be used in a variety of different applications and in a variety of different industries to dynamically and customizably manage information. Examples of such industries include the health care industry, the automobile industry, the real estate industry, the insurance industry, the financial industry, the energy and/or natural resources industry, the educational or academic industry, the gaming industry, the transportation industry, the manufacturing industry, the sales industry, and any other industry that is involved with or has need for document management and/or the managing of information.

Figure 3:
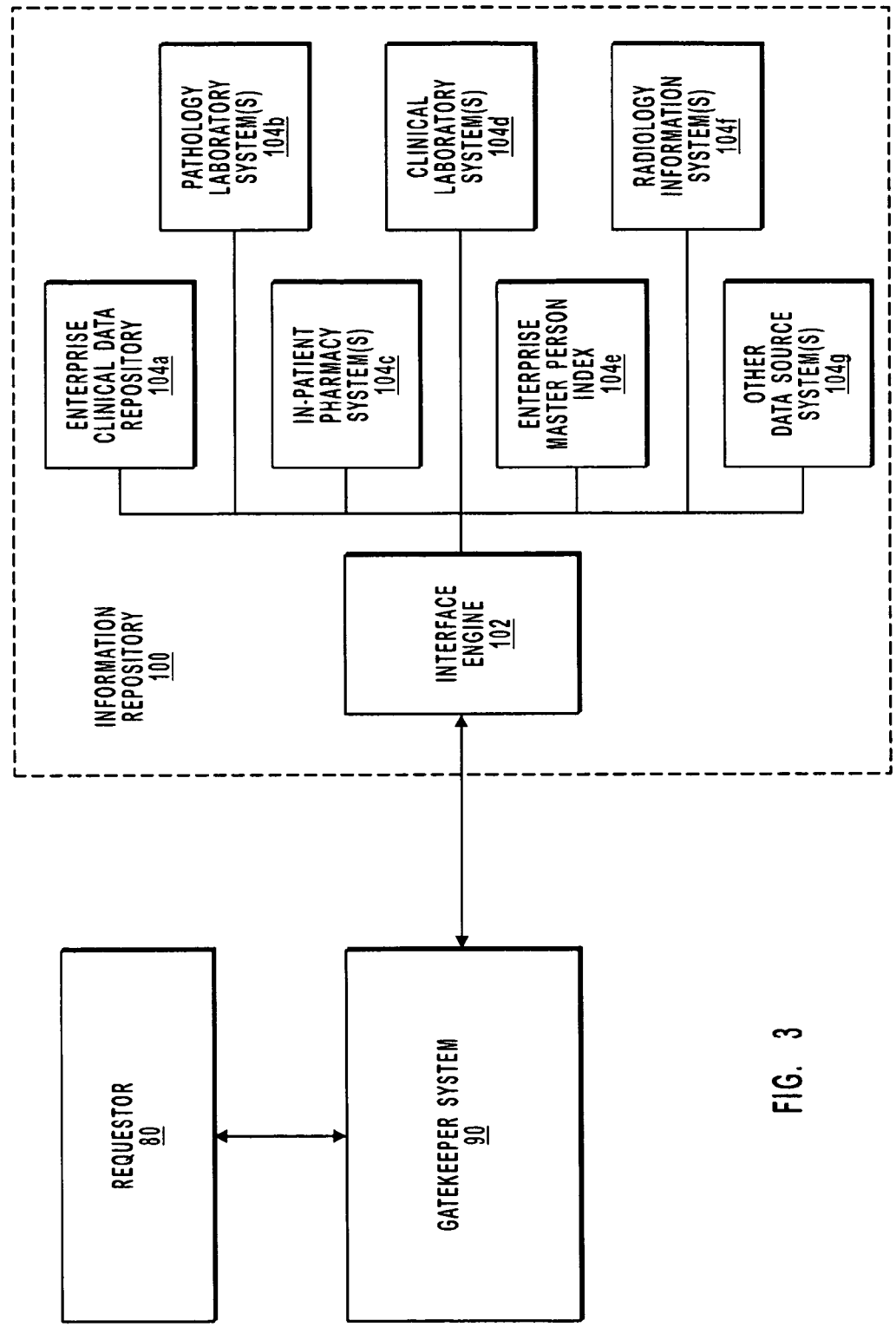
FIG. 3 illustrates a representative system that allows a requester to interface with a gatekeeper system to selectively obtain information from one or more of a variety of sources in an information repository in accordance with an embodiment of the present invention.

With reference now to FIG. 3, a representative system is illustrated that allows a requester 80 to interface with a gatekeeper system 90 to selectively obtain information from one or more of a variety of sources in an information repository 100. Requestor 80 represents any person or entity that desires to obtain information. Examples of such requestors include insurance companies, care providers, researchers, patients, and the like.

For example, the requestor 80 may request to see particular information from a covered medical entity. The enterprise provides for this capability via retrieval request and processing procedures that are afforded to the requestor (e.g. an insurance underwriter) who presents an authenticated authorization or signed consent by the patient. Therefore, the patients themselves may request a copy of any and all of their patient-specific information at any time. The entity responds by sending the information to the requestor in a timely manner.

In the illustrated embodiment, the information repository 100 includes a variety of information/data sources that may be located locally or remotely from each other. The illustrated data sources include enterprise clinical data repository 104a, pathology laboratory system(s) 104b, in-patient pharmacy system(s) 104c, clinical laboratory system(s) 104d, enterprise master person index 104e, radiology information system(s) 104f, and other data source system(s) 104g. Accordingly, when information is requested, the data is selectively obtained from one or more of the data sources using an interface engine 102, which interfaces with gatekeeper system 90 to provide a report in response to requestor 80.

In one embodiment of the present invention, information is obtained by the information repository through the receipt of individual transmittal sets that are sent via facsimile or otherwise to the repository, as will be further discussed below. The information repository preserves a copy of all of the transmittal sets received and allows for selectively obtaining a digital copy of any of the transmittal sets.

As illustrated in FIG. 3, gatekeeper system 90 provides a single point of entry for requests. The requests may be from external or internal requesters. Accordingly, anyone that is authorized enters requests through a single point of entry. In one embodiment, the point of entry receives fully-digital authorizations and consents for retrieval from external sources, bringing diverse external data feeds through the entry point to facilitate patient safety.

As will be further discussed below, processing performed by the enterprise to respond to requests received include processing an authenticated request for a copy of a patient-specific record. Embodiments of the present invention embrace the use of flags to facilitate processing. For example, a flag is set for the output of all retrieval functions to be in a desired format so that the entity may easily print the information/documents or electronically transmit them to the requestor in a format that is useful to the requester. A flag is set in an index of gatekeeper system 90 and also in the specific record in the audit trail archive at gatekeeper system 90 that the request is, for example, a patient-driven request. A flag is set in the index of gatekeeper system 90 and also in the specific record in the audit trail archive of gatekeeper system 90 that the information in this record has not yet been commented upon by the patient.

Other processing includes the preparation of a cover page that includes specific information and instructions for the patient delineating their rights under a particular law or regulation. An internal reference number is assigned for a particular record so that it may be used to expedite the search for any future referencing of the record. A dedicated FAX number is used for conveyance of information via facsimile, including the actual cover sheet that used to send back comments if a response is provided via facsimile. The output is provided in a patient-specified format and transmitted to the patient in a secure manner.

Accordingly, when requests are received by gatekeeper system 90, the information is selectively obtained from one or more data sources, including locally at system 90, to provide the requested information to the requestor in the form of a report, as will be discussed below. Embodiments of the present invention also embrace the ability of requesters, such as patients, to comment on the particular information. For example, patients may send their comments to the gatekeeper system via any number of ways or formats such as, via facsimile, standard courier, mail, electronically, etc. If sent by facsimile, a particular fax number may be provided and dedicated for the purpose of receiving requestor information. For example, in one embodiment it is a fax modem that is set to only receive facsimiles. Accordingly, the comments are received in a specific location assuring that they will not be lost.

When a response (e.g. comment) is received from a patient, the mechanisms for attaching any and all comments as if they were attached files to the original request/response is invoked and appears in the audit trail that will be discussed below. When information is received via a facsimile store, the images of the comments in a patient response file are stamped the corresponding time and date for incorporation into the record. In one embodiment, all flags and mechanisms that enable tracking of all interactions and communications with the patient are enabled and initiated.

Embodiments of the present invention embrace the managing of comments received from requestors, such as patients. For example, patients may respond in any number of ways and there are appropriate mechanisms to address and deal with their individual responses. In one embodiment, the entity is enabled to appropriately support dealing with all aspects of interactions with the patient as required under the enacted regulations. Examples include setting a flag to indicate that the patient has responded with the status set to the verification of the completeness and/or accuracy of the information, the providing of minor comments, the providing of substantial comments, additions made to records, requests made for changes to the information.

As illustrated in FIG. 3, once the requested information is obtained and is to be provided to the requester, a single point of exit for the transmission of individually identifiable patient data that is sent out in response to legitimate patient-approved requests is provided by gatekeeper system 90. The single point of exit creates a revenue opportunity via completely certified, de-identified data. Accordingly, de-identified information can be selectively sold to a variety of buyers, such as pharmaceutical companies, insurance companies, researchers, etc. In one embodiment, the information provided is encrypted. When the information is not de-identified, the individually identifiable patient data is sent out in response to legitimate, authenticated, patient-approved requests.

In accordance with the present invention, information released to a requestor goes through the gatekeeper system. In other words, the information is not provided directly from the individual data sources to the requester. Instead, the information from the data sources goes through the gatekeeper system to provide the information as a report to the requester.

Embodiments of the present invention embrace source data systems that are secure from electronic and physical intrusion. Organizations utilize a combination of biometric and digital signature technologies to control physical and electronic access.

As provided above, all requests for data from a requester 80, whether received electronically or otherwise, are entered into the gatekeeper system for processing. This includes all requests regardless of their origin. For example, requests received via facsimile, including a signed authorization, are scanned into the gatekeeper system. Such documents are compressed, digitized images that are bound to the information that is retrieved, and both are included in an audit trail that is maintained by gatekeeper system 90.

Since system 90 is the exclusive mechanism for receiving incoming requests for information, it consolidates all facets of the requesting process, including validation, verification, and authentication of not only the requests but also the accompanying patient-signed authorization/consent. System 90 also provides the mechanisms to receive authenticated electronic requests from an entire industry (e.g., the insurance industry) and from all other legitimate, patient-authorized requestors, including the patients themselves. Accordingly, the system provides the tools to receive and respond to patient-initiated requests to retrieve, review, and comment on the data that the enterprise has on file for the patients. As a result, the system eliminates the burden on the data sources to provide the information directly to the requestors, and in accordance with established regulations.

Figure 4:
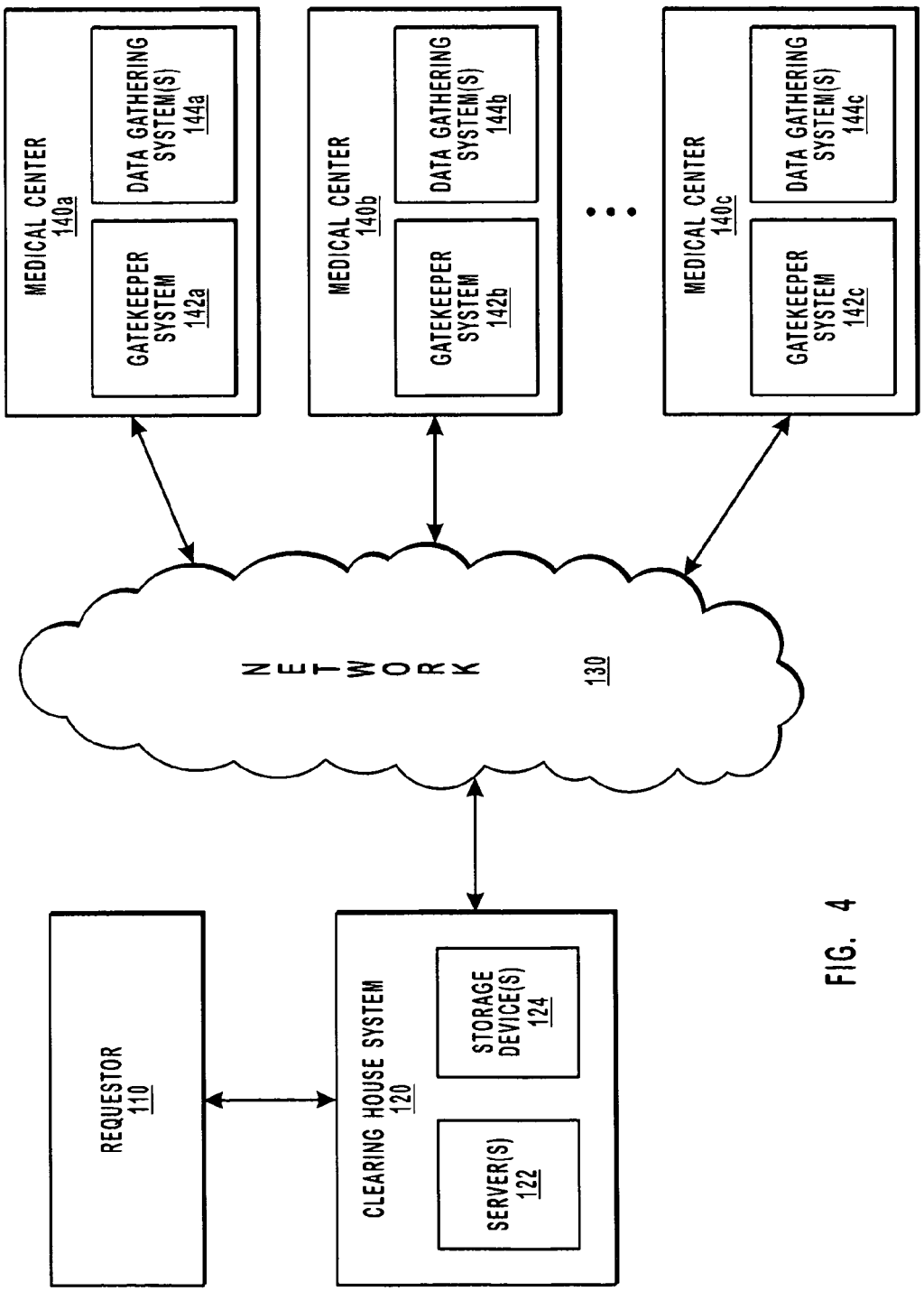
FIG. 4 illustrates a representative system that allows a requestor to interface with a clearinghouse system, which is in communication with a variety of medical systems (e.g., hospitals, clinics, laboratories, etc.), wherein each medical system includes a corresponding gatekeeper system in accordance with an embodiment of the present invention.

With reference now to FIG. 4, a representative system of the present invention is illustrated that allows a requestor 110 to interface with a clearinghouse system 120, which provides the single point of entry and the single point of exit. Clearinghouse system 120 includes one or more servers 122 and one or more storage devices 124, and is in communication with a variety of medical centers 140 (e.g., hospitals, clinics, laboratories, etc.), wherein each medical center 140 includes a corresponding gatekeeper system 142. In FIG. 4, each gatekeeper system 142 selectively provides information to clearinghouse system 120. A report is provided to requestor 110 in response to a request. The information of the report is archived for a period of time (e.g., 6 years) to satisfy the time limit set by regulation.

Figure 5:
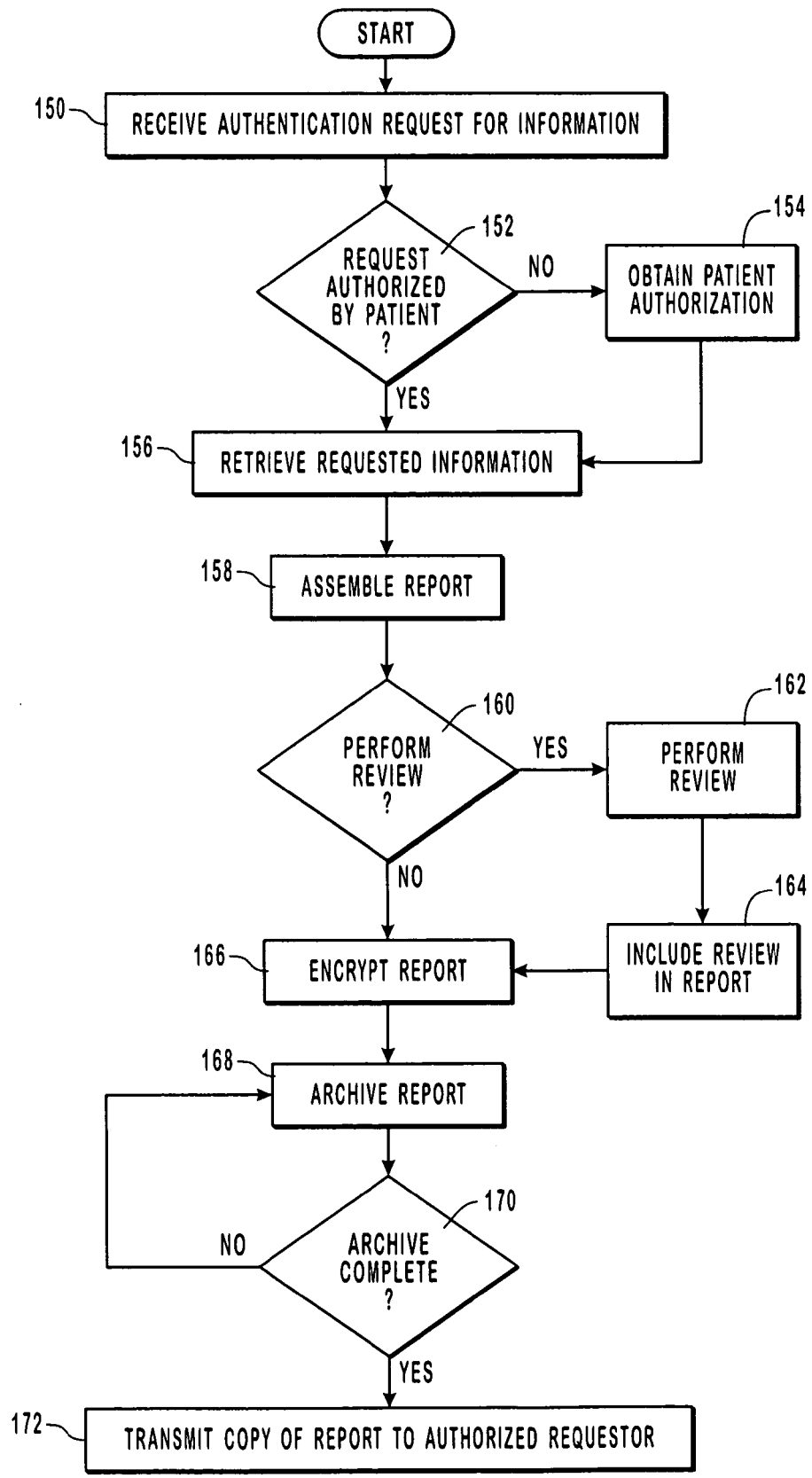
FIG. 5 illustrates a flowchart that provides a representative embodiment of processing that is performed to create, archive, and transmit a patient-specific report.

With reference now to FIG. 5, a flowchart is illustrated that provides a representative embodiment of processing that is performed to create, archive, and transmit a patient-specific report. In FIG. 5, execution begins at step 150, where an authenticated request for information is received. At decision block 152 a determination is made as to whether or not the request is authorized by the patient. If it is determined that the request is not authorized by the patient, execution proceeds to step 154, where patient authorization is obtained and then to step 156. Alternatively, if it is determined at decision block 152 that the request is authorized by the patient, execution proceeds directly to step 156.

In step 156 the requested information is retrieved. A report is then assembled at step 158. In one embodiment, the report includes such information as the request made, the response being provided, the corresponding audit trail, and other related information that is useful. A determination is made at decision block 160 as to whether or not to perform a review of the report. If it is determined at decision block 160 that a review of the report is to be performed, execution proceeds to step 162 for the performance of the review of the report, and then to step 164, where the review is included in the report. Execution then proceeds to step 166. Alternatively, it is determined at decision block 160 that a review is not to be performed on the report, execution proceeds directly to step 166.

At step 166 the report is encrypted and at step 168 the report is archived in a storage device. Execution then proceeds to decision block 170 for a determination as to whether or not the archive is complete. If it is determined that the archive is not complete, execution returns back to 168 to allow the report to be completely archived. Alternatively, if it is determined at decision block 170 that the archival of the report is complete, execution proceeds to step 172, where a copy of the report is transmitted to the authorized requestor.

Figure 6:
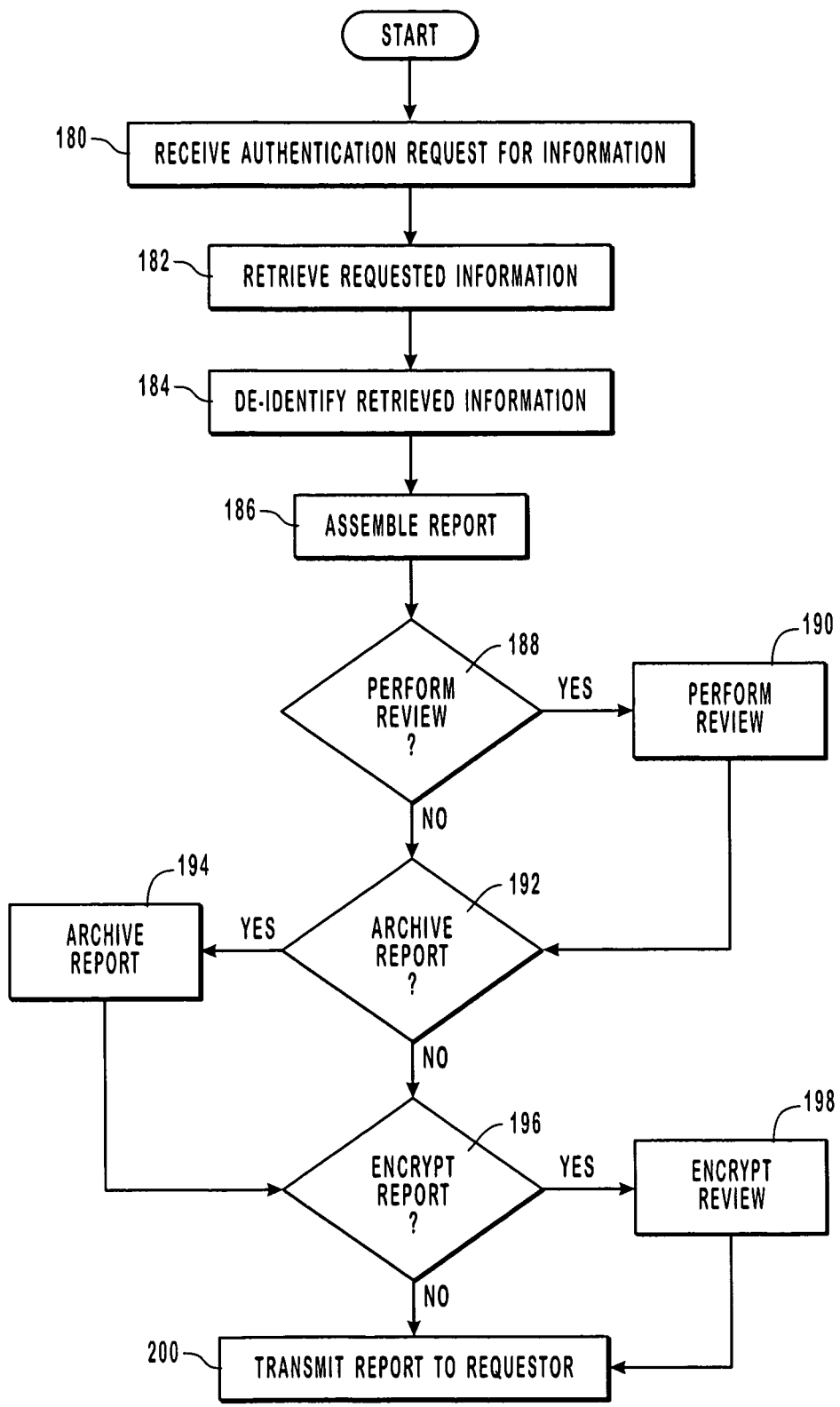
FIG. 6 illustrates a flowchart that provides a representative embodiment of processing that is performed to create, archive, and transmit a de-identified report.

FIG. 6 illustrates a flowchart that provides a representative embodiment of processing that is performed to create, archive, and transmit a de-identified report. In FIG. 6, execution begins at step 180, where an authenticated request for information is received. The requested information is then retrieved at step 182 and the retrieved information is de-identified at step 184. At step 186 the report is assembled. Execution then proceeds to decision block 188 for determination as to whether or not to perform a review. If it is determined at decision block 188 to perform a review, execution proceeds to step 190 for the performance of the review and then to decision block 192. Alternatively, it is determined at decision block 188 that a review is not to be performed execution proceeds directly to decision block 192.

At decision block 192 a determination is made as to whether or not to archive the report that has been assembled. If it is determined at decision block 192 that the report is to be archived, the execution proceeds to step 194 for the archival of the report and then to decision block 196. Alternatively, if it is determined at decision block 192 that the report is not to be archived, execution proceeds directly to decision block 196.

At decision block 196 a determination is made as to whether or not to encrypt the report that has been assembled. If it is determined at decision block 196 that the report is to be encrypted, execution proceeds to step 198 for the encryption of the report and then to step 200. Alternatively, if the report is not to be encrypted, execution proceeds directly to step 200, where the report is transmitted to the requestor.

Figure 7:
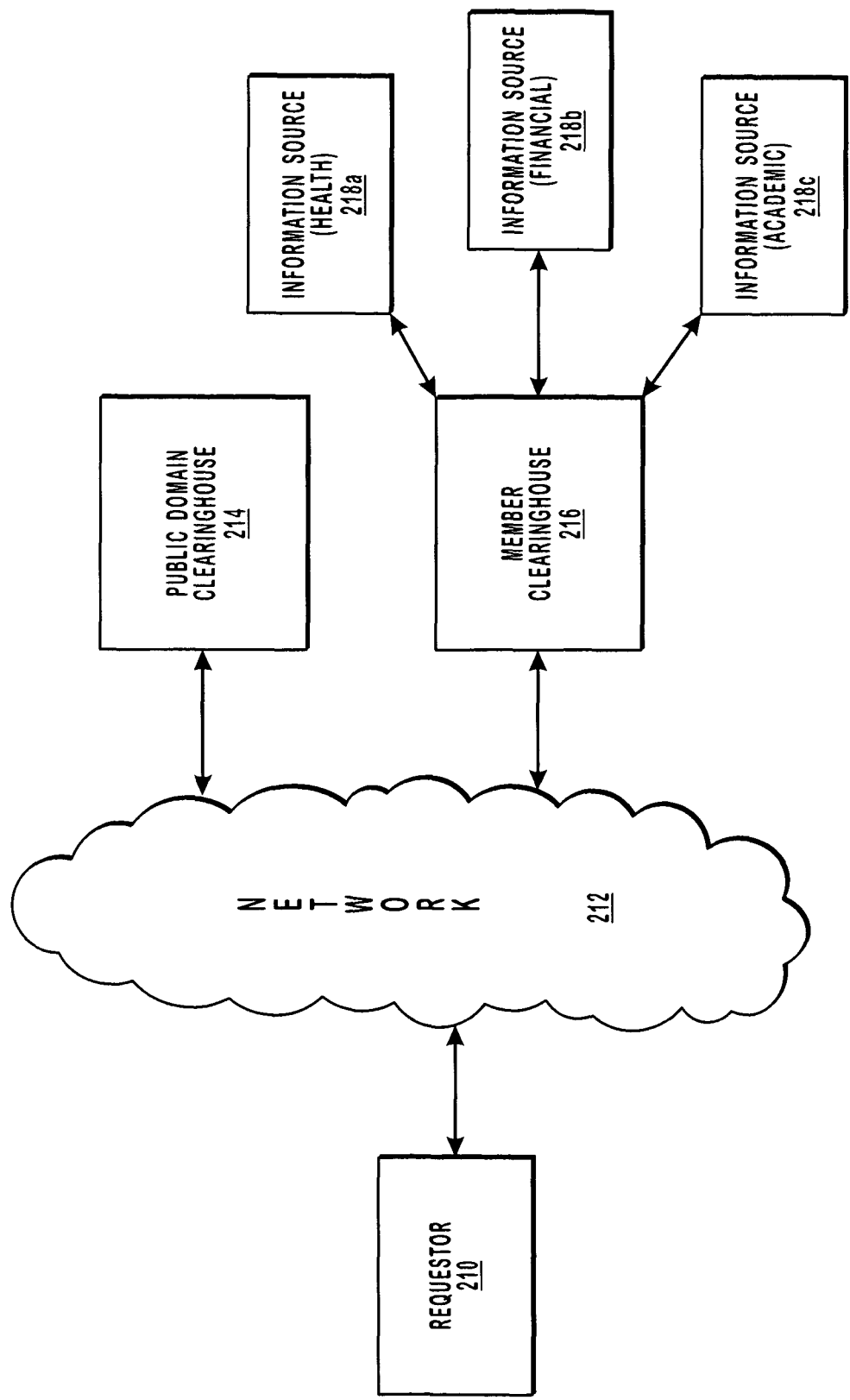
FIG. 7 illustrates a representative system that enables a requestor to selectively obtain information from a public domain clearinghouse and/or a member clearinghouse, wherein the member clearinghouse enables members to update and/or modify personal information in accordance with an embodiment of the present invention.

With reference now to FIG. 7, a representative system is illustrated that enables a requester to selectively obtain information from a public domain clearinghouse 214 and/or from a member clearinghouse 216, wherein the member clearinghouse enables members to selectively update and/or modify personal information. Member clearinghouse 216 obtains information from information sources 218, which provide personal information, such as medical/health, financial, academic, and/or any other type of information that would be useful to a requestor. The member clearinghouse provides a single point of entry and a single point of exit to manage and oversee the information that is provided to the requestor.

With reference now back to FIG. 2, at least some embodiments of the present invention embrace the use of a fax machine that is configured to transmit and receive information. A physician or representative of the physician uses the fax machine (illustrated as client 50) to transmit a set of information across a communications medium (network 70) to one or more servers 44, which preserve a digital copy of the transmission set and enable selective use of the digital copy. In a further embodiment, network 70 is a set of telephone lines that connect a fax machine to a server.

In one embodiment the transmission set includes an information sheet having a bar code configured for scanning, an information sheet without a bar code, patient information, and an end of transmission sheet. The bar code enables the server or another computer device to recognize/obtain information from scanning the bar code. The information obtained may include, for example a physician's name, a patient's name, a clinic's name, or any other useful information. Accordingly, in one embodiment, when the server receives the transmission set, it scans the bar code and recognizes which client/patient/clinic corresponds to the transmission set. The information sheet without a bar code is optional. It provides a backup to the bar code just in case the bar code is not encoded or scanned correctly. The information sheet without the bar code provides information associated with the transmission set, such as the physician's, patient's, and/or clinic's name, or any other useful information associated with the transmission set. The patient information is any information that is to be preserved and/or provided. In one embodiment, the patient information includes data that is to be sent to, for example, an insurance company. The end of transmission sheet separates transmissions and ensures that the entire transmission was received.

As provided above, the transmission set is provided to a server, which preserves the transmission set in a digital format. In a further embodiment, the server acknowledges receipt of the transmission set by sending to the fax machine a confirmation as to the receipt of the transmission set. In one embodiment, the confirmation includes an identifier (e.g., number, code, etc.) that is associated with the digital copy that may be used to selectively obtain a copy of the digital copy. In a further embodiment, the confirmation received at the fax machine indicates receipt of the transmission set by the server and may selectively provide information relating to the transmission set, such as the physician name, patient name, or any other information.

The server preserves the digital copy of the transmission set for a period of time, such as a period established by regulation (e.g., 7 years). Meanwhile, the physician maintains the confirmation along with the transmission set in a file and can selectively obtain the digital copy of the transmission set from the server by utilizing the identifier associated with the transmission set.

Accordingly, the fax machine is used to manage data in compliance with regulated privacy, security, and electronic transaction standards. Moreover, embodiments of the present invention embrace the utilization of a fax machine to convert a hardcopy of one or more documents into a digital format and to transport information to a remote location (e.g., server) for storage. Moreover, embodiments of the present invention embrace selectively processing the digital copy as provided herein, such as de-identifying the information to provide it to a third-party.

While the foregoing discussion has included disclosure relating to systems and methods for managing data in compliance with regulated privacy, security, and electronic transaction standards, and in particular dynamically managing information in compliance with the Health Insurance Portability and Accountability Act (HIPAA) regulations. Embodiments of the present invention also embrace systems and methods for managing data in compliance with privacy, security and/or retention standards in other aspects of the healthcare industries as well as other business industries, including the automobile industry, the real estate industry, the insurance industry, the financial industry, the legal industry, the educational or academic industry, the gaming industry, the transportation industry, the energy and/or natural resources industry, the manufacturing industry, the sales industry, and any other industry for which documents are kept for a period of time.

Virtually every employer obtains and is required to retain (e.g., for tax purposes, compliance with wages and hours laws, OSHA audits, health care insurance, etc.) confidential information relating to employees and/or prospective employees. In some embodiments, a dynamic and customizable system is used to keep track of internal records, including human resources records, financial reports, contracts, and the like that are desired to be retained for a period of time.

Relating further to the health care industry, and aside from the Health Insurance Portability and Accountability Act (HIPAA), health care providers face several complicated sets of record-keeping requirements that, to varying degrees, involve confidential medical information that patients have provided to doctors, hospitals, etc., and have consented to have those institutions keep on hand and/or to release to other institutions or individuals (e.g, other doctors, hospitals, pharmacies, insurance companies or individuals, etc.). At times, the consent is provided as part of an admission agreement and consent for medical treatment, and may be signed, for example, by a patient at the time of admission to a hospital. Further, the patient's consent may be required to perform any proposed treatment, operation or procedure. The consent or authorization may be given as a condition of obtaining health insurance coverage. At times, the consent may be revoked by the patient giving a written revocation.

Record-keeping rules or regulations, and corresponding retention requirements, may come from state licensing requirements, Medicare regulations, malpractice insurance carriers' requirements, risk management policies adopted by particular institutions, or from other sources.

By way of example, Medicare requires that medical records of health care providers be maintained for at least five years. The federal government has ten years within which to bring suit against a health care provider for false claims and other misconduct, so that tends to make health care providers keep at least some records that length of time. In one state jurisdiction, hospitals are required to keep records for at least ten years after the most recent service, to notify patients before records are destroyed, and to consult with legal counsel before destruction of the documentation. For records pertaining to minors in one jurisdiction, the retention period is for the period of minority plus an additional ten years, which is therefore a period of time of 28 years less the age of the minor at the relevant time. A Board of Medical Examiners has recommended that doctors retain all patient records for at least seven years after the last date of treatment. Embodiments of the present invention dynamically ensure compliance with such rules or regulations.

Figure 8:
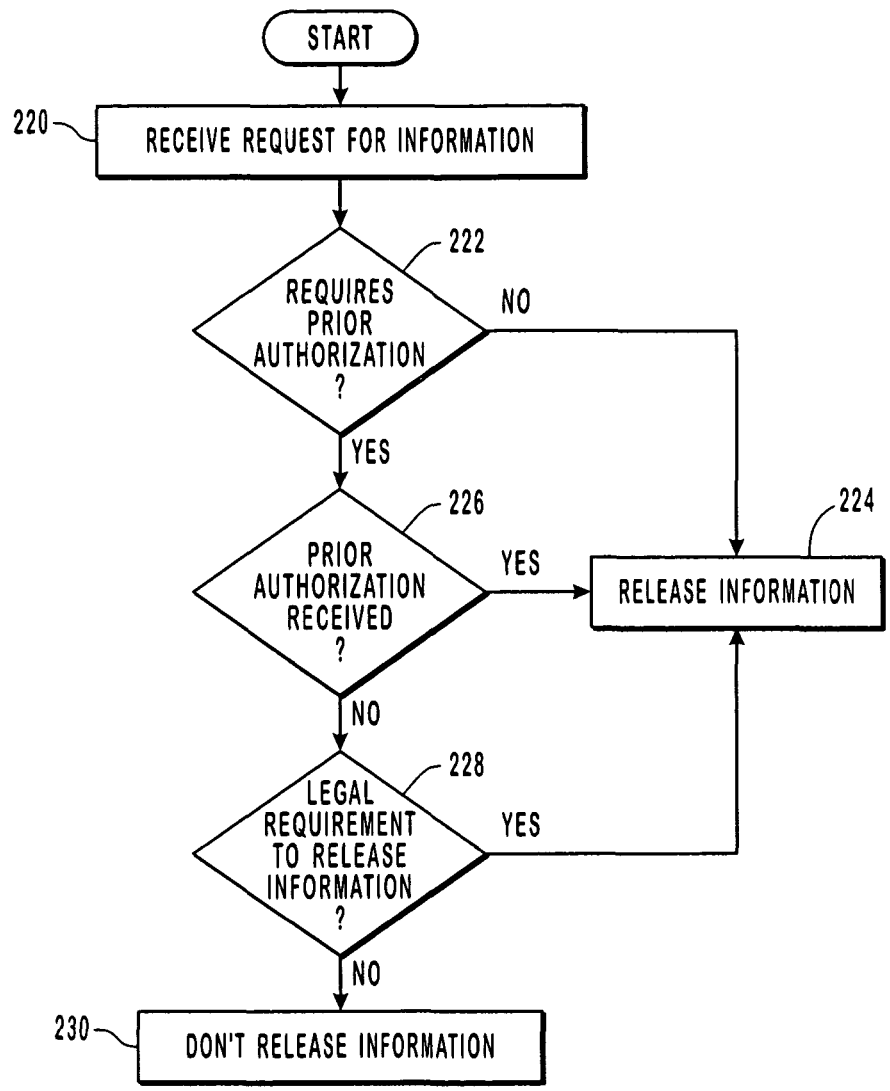
FIG. 8 illustrates a flow chart that provides representative processing relating to receiving a request for information and determining whether to release the requested information in accordance with a representative embodiment of the present invention.
Figure 9:
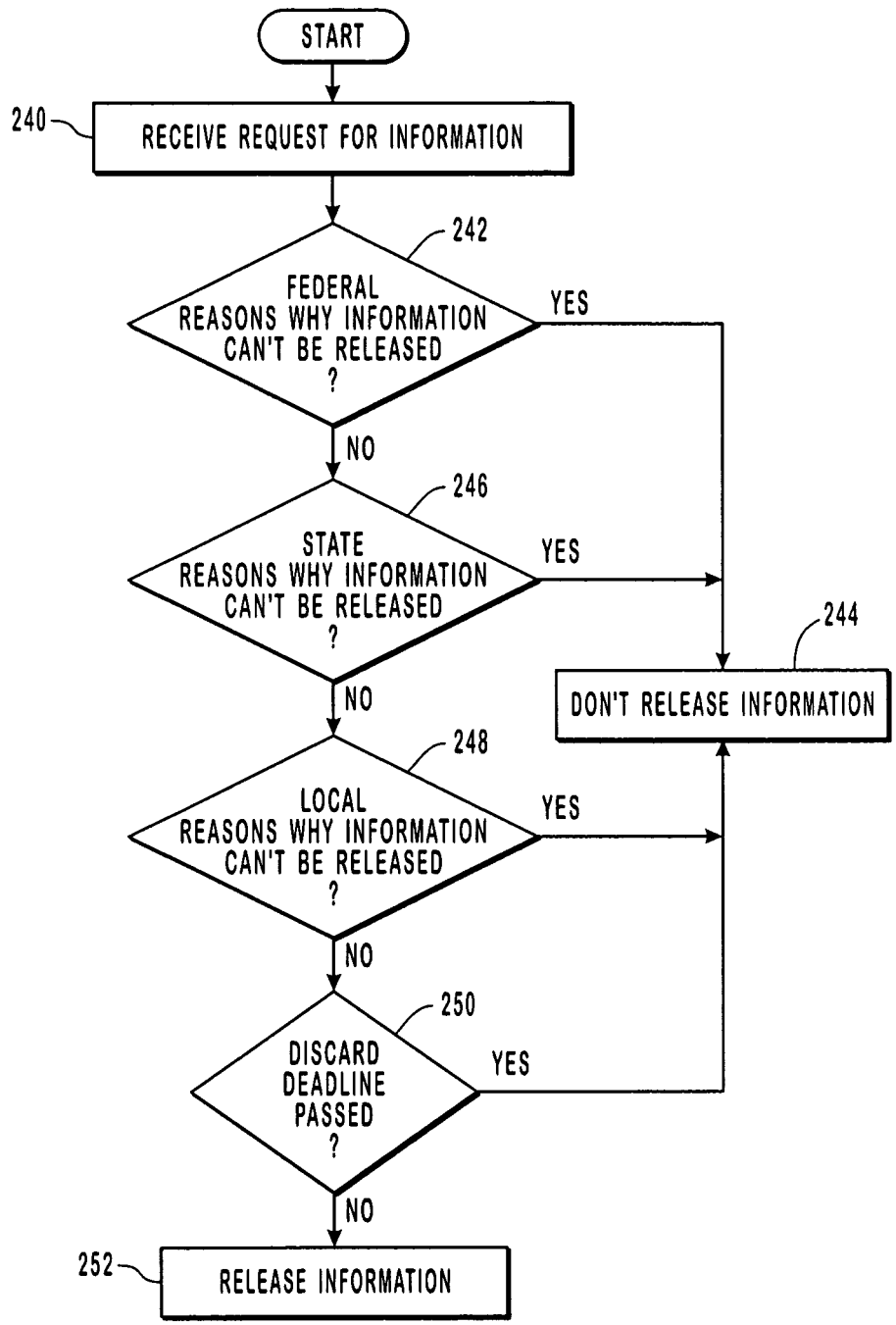
FIG. 9 illustrates a flow chart that provides representative processing relating to receiving a request for information and determining whether to release the requested information in accordance with another representative embodiment of the present invention.
Figure 10:
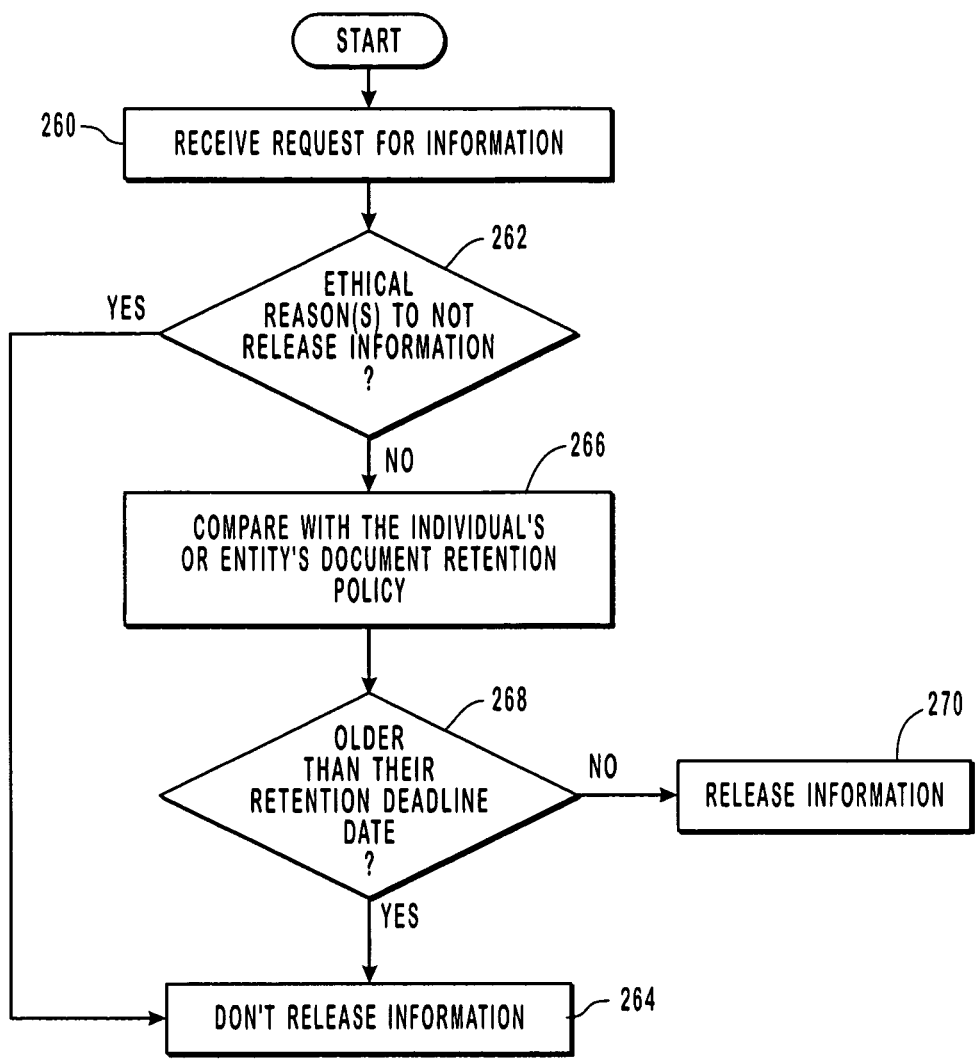
FIG. 10 illustrates a flow chart that provides representative processing relating to receiving a request for information and determining whether to release the requested information in accordance with another representative embodiment of the present invention.

With reference now to FIGS. 8-10 flow charts are provided that illustrate representative processing relating to receiving a request for information and determining whether to release the requested information in accordance with representative embodiments of the present invention. In FIG. 8, execution begins at step 220, wherein a request for information preserved in a dynamic and customizable archival system is received. A determination is made at decision block 222 as to whether or not a release of the requested information requires prior authorization. If it is determined that decision block 222 that prior authorization is not required, execution proceeds to step 224 for the release of the requested information.

Alternatively, if it is determined at decision block 222 that prior authorization is required, execution proceeds to decision block 222 for a determination as to whether or not the prior authorization has been received. If it is determined at decision block 226 that the prior authorization has been received, execution proceeds to step 224 for the release of the requested information. Alternatively, if it is determined at decision block 226 that the prior authorization has not been received, execution proceeds to decision block 228 for a determination as to whether or not there exists a legal requirement to release information. Examples of such legal requirements include receipt of a court order, a valid request from a law enforcement agency, and the like.

If it is determined at decision block 228 that there exists a legal requirement to release the information, execution proceeds to step 224 for the release of the requested information. Alternatively, if it is determined at decision block 228 that no legal requirement to release the requested information exists, execution proceeds to step 230, wherein the requested information is not released, thereby denying the original request for information.

In FIG. 9, execution begins at step 240 where a request is received for information preserved in a dynamic and customizable archival system. A determination is then made at decision block 242 as to whether or not there exist any federal reasons why the requested information cannot be released. If it is determined at decision block 242 that there exist federal reasons why the information cannot be released, execution proceeds to step 244 where the information is not released and the request is therefore denied.

Alternatively, if it is determined that decision block 242 that there are no federal reasons why information cannot be released, execution proceeds to decision block 246 for a determination as to whether not there exist any state reasons why the requested information cannot be released. If it is determined at decision block 246 that there exist state reasons why the requested information cannot be released, execution proceeds to step 244 where the requested information is not released and thus the request is denied. Alternatively, if it is determined at decision block 246 that no state reasons exist as to why the requested information cannot be released, execution proceeds to decision block 248.

At decision block 248, a determination is made as to whether or not there exist local reasons why the requested information cannot be released. If it is determined at decision block 248 that local reasons exist as to why the requested information cannot be released, execution proceeds to step 244 where the requested information is not released and thus the requested is denied. Alternatively, if it is determined at decision block 248 that there are not reasons why the requested information cannot be released, execution proceeds to decision block 250.

At decision block 250, a determination is made as to whether or not an established discard deadline date has passed. Such discard deadlines may come from, by way of example, state licensing requirements, Medicare regulations, malpractice insurance carriers' requirements, risk management policies adopted by particular institutions, internal policies or regulations, or from other sources. If it is determined that decision block 250 that the discard deadline date has passed, execution proceeds to step 244 where the requested information is not released. Alternatively, if it is determined at decision block 250, that the discard deadline has not passed, execution proceeds to step 252 for the release of the requested information.

In FIG. 10 execution begins at step 260, where a request is received for information preserved in a dynamic and customizable archival system. A determination is then made at decision block 262 as to whether or not any ethical reasons exist for not releasing the information. If it is determined at decision block 262 that there are ethical reasons to not release the information, execution proceeds to step 264, where the information is not released and thus the request is denied. Alternatively, if it is determined at decision block 262 that there are no ethical reasons preventing release of the information, execution proceeds to step 266.

At step 266 a comparison is made with the document retention policy of the individual/entity. A determination is then made at decision block 268 as to whether or not the date of the information is older than the retention deadline date of the individual/entity. If it is determined at decision block 268 that the date of the information is older than the retention deadline date of the individual or entity, execution proceeds to step 264, where the requested information is not released and thus the request is denied.

Alternatively, if it is determined at decision block 268 that the requested information is not older than the retention deadline date of the individual/entity, execution proceeds to step 270, where the requested information is released.

Thus, the representative embodiments illustrated in FIGS. 8-10 provide representative processing relating to receiving request is received for information preserved in a dynamic and customizable archival system and determining whether to release the requested information in accordance with representative embodiments of the present invention. Such embodiments embrace a variety of industries in addition to the health care industry. By way of example, in the automobile industry there exist regulations on the automobile dealers that are regulated by various federal and state laws as well as industry trade group standards. Further, automobile dealers interface with companies/entities that lend money to customers for the purchase or lease of vehicles, and companies/manufacturers/entities provide warranties and/or extended warranties.

As an example, the National Automobile Dealers Association (NADA) is a national trade group that has approximately 20,000 new car and truck dealers as members. Individual states have their own associations as well. NADA publishes both a records retention checklist for its members and various management education guides. Relating to examples of federal regulatory statutes that affect the industry, NADA publishes Management Guides on Federal Records Retention and Reporting, the Federal Wage-Hour Law and Equal Pay Act, the Immigration Reform and Control Act of 1986, Federal Tax Issues, the OSHA Respiratory Protection Rule, and Consumer Leasing. NADA's guidelines for dealers on record retention range from keeping records permanently (e.g., for audit reports of accountants, corporate records, pension records, etc.) to keeping them for a particular period of time that has been specified by federal or state regulations (e.g., retain car leases for 7 years after expiration, retain invoices for 10 years from the vehicle purchase date, and retain extended warranty documents for 10 years after expiration.)

In many instances, particularly when the purchase of a vehicle is financed or a vehicle is leased, dealers obtain personal financial information about prospective buyers or lessees. Prospective customers consent up-front to providing such information, consent to the dealer running credit checks and generally looking into their creditworthiness, etc. Such personal financial information is confidential and is required to be retained, and is dynamically and customizably managed by an embodiment of the present invention. Further, an embodiment of the present invention manages information relating to an automobile dealer's own records, such as personnel files, etc., which contain confidential information, including medical information.

In the automobile industry, consent is given to release information. For example, a customer may authorize a dealer and any corresponding financial institution to investigate the customer's credit and employment history, to obtain credit reports, and/or release information about the customer's credit experience as the law permits. If an account is created by the dealer, the customer may authorize the dealer to obtain credit reports for the purpose of reviewing or taking collection action or for other legitimate purposes associated with the account.

The real estate industry includes real estate brokers and agents, title companies, mortgage brokers, and all kinds of lenders. There exist a plethora of documents that such individuals/entities of the real estate industry must retain for periods of time after a deal either closes or ends that include confidential information.

Title companies, lenders and mortgage brokers obtain and retain confidential financial information. Anyone who borrows money through a loan secured by real estate has to agree to provide all kinds of financial information—tax returns, bank statements, financial statements, copies of brokerage account statements, copies of credit card bills, etc., as well as authorizing the lender or mortgage broker to find out information about oneself. Accordingly, embodiments of the present invention address dynamically and customizably managing such documentation/information in compliance with the necessary business standards.

Regulations and standards also exist in the insurance industry, such as life, health, disability, property and casualty insurance companies and agencies. As an example, the entities have a plethora of files involving applications from individuals for life insurance and disability insurance. Life insurance companies also sell products that are covered by the federal and state securities laws. Accordingly, agents are in possession of confidential medical information that applicants for policies have to disclose and have to agree that the agent may pass on to the company as well as confidential financial information that applicants also have to disclose. The files often include additional personal information such as trust documents, divorce decrees, etc.

Insurance compliance manual reference the need to comply with an array of federal and state document retention requirements, with the default position in case of any doubt being to retain records permanently. Some of the specific provisions require retention of records for up to ten years. Some maintain files forever on applicants who have policies issued because the agent never knows what he/she may need to look up in a file. Accordingly, confidential medical and financial information, even though it may be way out of date, remains in files. Accordingly, embodiments of the present invention address dynamically and customizably managing such documentation/information in compliance with the necessary business standards.

In the financial services industry there exist banks, securities firms, credit unions, etc., which are all highly regulated and all in possession of sensitive financial information that people submit in connection with loans, mortgages, lines of credit, etc. Such regulations protecting consumer financial information include Title V of the Gramm-Leach-Bliley Act, the Fair Credit Reporting Act, the Electronic Fund Transfer Act, the Right to Financial Privacy Act, and the Children's Online Privacy Protection Act. Some require consent up front in a transaction relationship or consent at some point before there can be a disclosure or release of information. Accordingly, embodiments of the present invention address dynamically and customizably managing such documentation/information in compliance with the necessary business standards.

In the legal industry, there exist regulations relating to document retention policies, such as the Sarbanes-Oxley Act. Accordingly, embodiments of the present invention address dynamically and customizably managing such documentation/information in compliance with the necessary standards.

Figure 11:
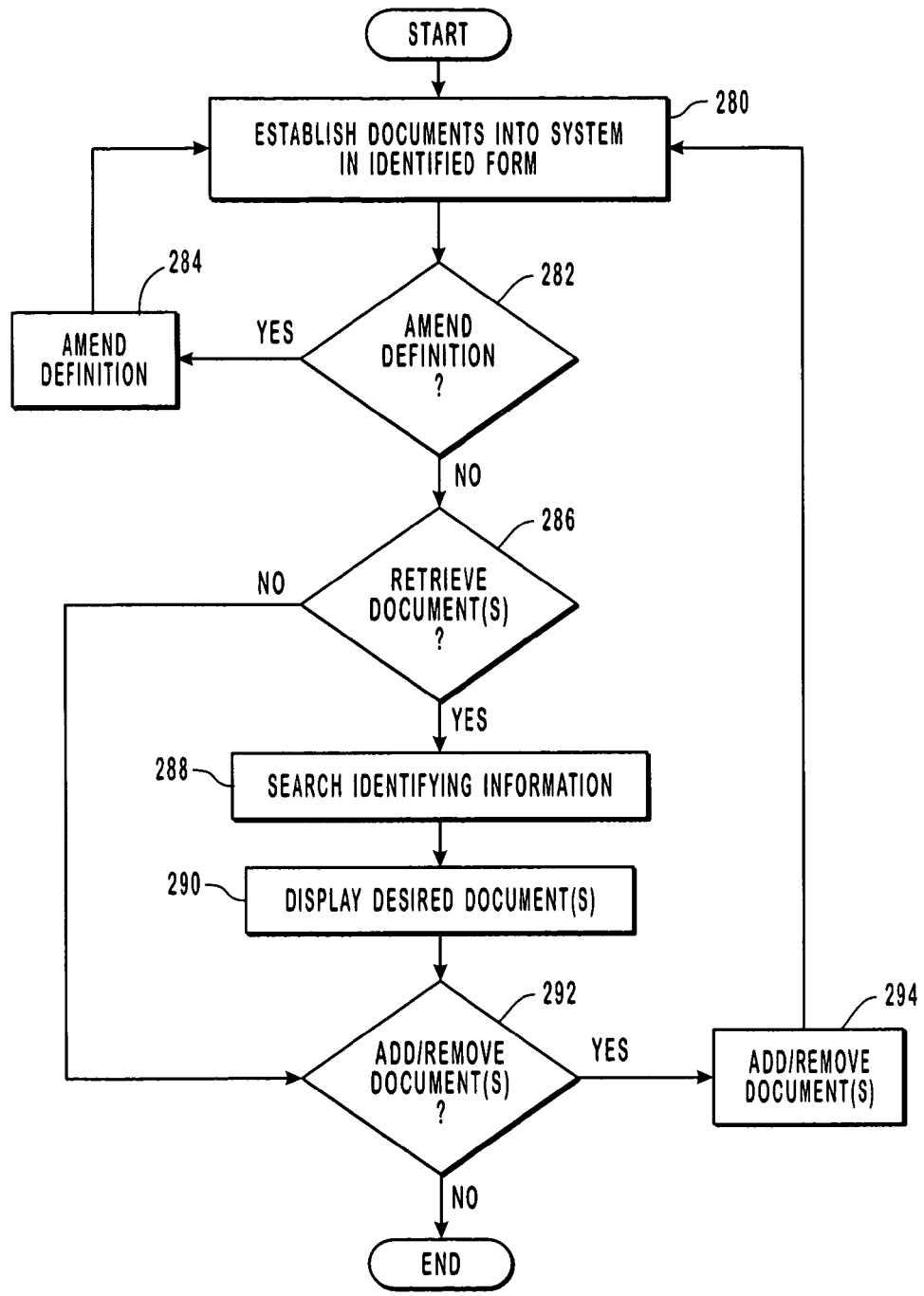
FIG. 11 illustrates a flow chart that provides representative processing relating to dynamically and customizably, archiving, managing, and retrieving document information in accordance with a representative embodiment of the present invention.
Figure 12:
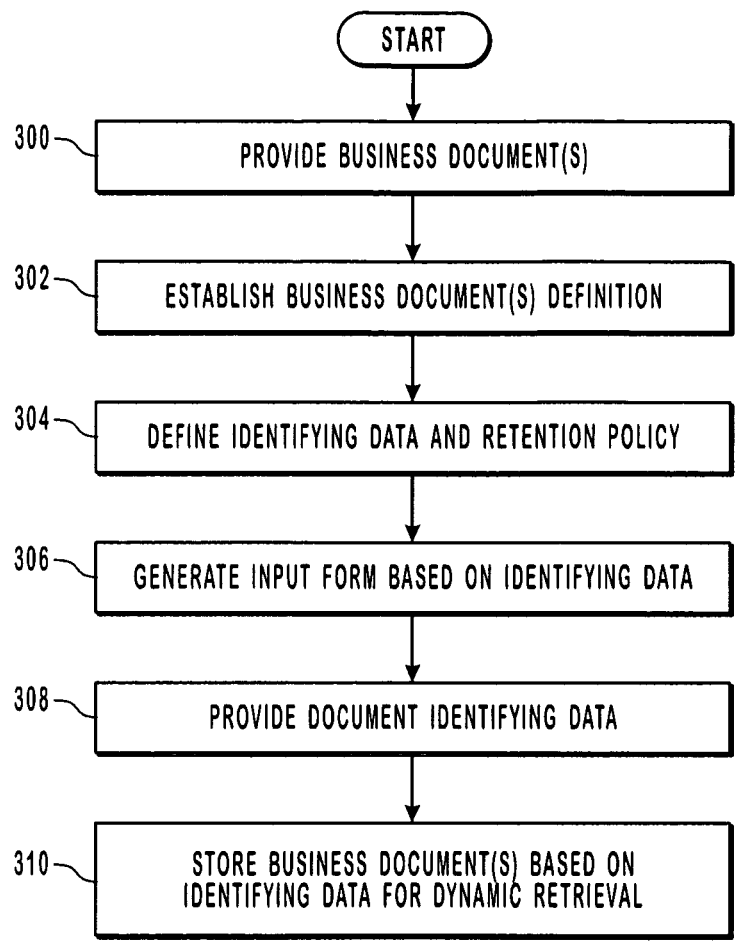
FIG. 12 illustrates representative processing relating to establishing documents into a system in an identifiable form to dynamically and customizably archive, manage and retrieve the documents in accordance with an embodiment of the present invention.

Accordingly, embodiments of the present invention address dynamically and customizably managing such documentation/information in compliance with the necessary business standards. FIGS. 11-12 illustrate representative processing relating to dynamically and customizably, archiving, managing, and retrieving document information in accordance with a representative embodiment of the present invention.

In FIG. 11 execution begins at step 280, where documents are established into a dynamic and customizable system in identifiable form. A representative manner for establishing documents is illustrated in FIG. 12, wherein one or more business documents are provided at step 300. A business document definition is established at step 302. Identifying data and retention policies are defined at step 304. An input form that is based on identifying data is generated at step 306. A document identifying data is provided at step 308. At step 310, business documents based on identifying data are stored for dynamic and customizable management and retrieval.

With reference back to FIG. 11, once the documents are established into a dynamic and customizable system in identifiable form at step 280, a determination is made at decision block 282 as to whether or not to amend the definition of the folder. In one embodiment, a particular set of records creates a dynamic and customizable folder for archiving, managing and retrieving the documents corresponding to the dynamic folder. If it is determined at decision block 282 that the definition of the folder should be amended, execution proceeds to step 284 where the folder definition is amended. Execution then proceeds back to step 280. Alternatively, if it is determined at decision block 282 that the folder definition is not to be amended, execution proceeds to decision block 286.

At decision block 286 a determination is made as to whether or not to receive documents. If it is determined at decision block 286 that documents are to be retrieved, execution proceeds to step 288 where the identifying information is searched to obtain the needed documents of the system. At step 290 the desired documents are displayed to the user. In an exact match, the particular document is displayed. In a non-exact match, multiple documents are displayed to allow the user to identify the particular document desired. Execution proceeds to decision block 292 for a determination as to whether or not to add or remove documents within the folder. Alternatively, if it is determined at decision block 286 that documents are not to be retrieved, execution proceeds directly to decision block 292.

At decision block 292 a determination is made as to whether or not to add or remove documents from the folder. In the present embodiment, the dynamic and customizable system allows for documents to be added or removed from a file as needed. If it is determined at decision block 292 that documents are to be added or removed, the documents are added or removed at step 294. Execution then proceeds back to step 280. Alternatively, if it is determined at decision block 292 that documents are not to be added or removed at this time from the folder, execution either ends or alternatively returns back to step 280.

In some embodiments, documents are included into a dynamic and customizable system that is searchable by a user of the system. In one embodiment, the system stores the information on a CD or DVD that is provided to the particular entity to search the documents by identifying information. In a further embodiment, the CD or DVD includes all of the identifying information and all associated images as one large HTML page. By inserting the CD or DVD, the entity or user can immediately bring up the HTML page and perform a search on the HTML page for the particular identifying data. A hyperlink is provided that allows the user to bring up a copy of the actual corresponding document.

Accordingly, in at least one embodiment the entity only requires the CD or DVD to obtain the needed document(s). In another embodiment, the dynamic and customizable system is an online system.

Further, an embodiment of the present invention includes a dynamic and customizable records storage system that allows for the identifying data to be changed, added or deleted. According, the system can change at any time as needed.

In some embodiments of the present invention, patient or individual consent is required before a particular document is released. Thus, in at least some embodiments, the processing requires a check to see if consent has been received prior to releasing the information.

Thus, embodiments of the present invention embrace information and document management. In particular, the present invention relates to systems and methods for managing data in compliance with privacy and security standards in business industries. The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

What is claimed is:

1. A method, implemented by a computing system, for providing a single point of entry for accessing business documents obtained from a plurality of external sources in compliance with privacy, security and retention standards, the method comprising:
　establishing, on one or more computer readable media accessible by the computer system, a repository of business documents that are obtained from a plurality of external sources such that the repository comprises a single point of entry for accessing the business documents, wherein access to the business documents is governed by one or more regulations based on the content of each business document, each business document stored in the repository including an associated identifier:
　receiving, by the computer system, a request for a first business document stored in the repository, the request including the identifier associated with the first business document;
　determining, by the computer system, whether the first business document is subject to a regulated requirement based on the content of the first business document that would preclude release of the first business document to the requestor, wherein the regulated requirement is a pre-established professional requirement that precludes release of the content of the first business document to the requestor;
　determining, by the computer system, whether consent of an individual of which the content pertains is required and whether the consent of the individual has been obtained if the consent is required such that;
　　when the requested information is not subject to the requirement and the consent of the individual has been obtained when the consent is required, the computing system accesses the first business document from within the repository using the identifier associated with the first business document and releases the first business document to the requestor; and
　　when the requested information is subject to the requirement, the computing system fails to provide the first business document to the requestor.

2. A method as recited in claim 1, the method further comprising:
　determining, by the computing system and when the requested information is subject to the requirement, whether there exists a legal requirement to release the first business document; and
　if there exists the legal requirement, releasing the first business document to the requestor.

3. A method as recited in claim 1, wherein the regulated requirement that precludes release of the first business document to the requestor based on the content of the first business document is at least one of (i) a federal regulation; (ii) a state regulation; (iii) a local regulation; (iv) an internal regulation; (v) a regulated retention time period; (vi) a professional requirement; and (vii) an ethical requirement.

4. A method as recited in claim 3, further comprising
　comparing, by the computing system, a pre-established retention time deadline of the holder of the first business document with a retention time deadline of whom the content of the first business document pertains; and releasing the first business document to the requestor if the content of the first business document is not subject to the requirement and the retention time deadline of whom the content of the first business document pertains has not expired.

5. A method as recited in claim 1, wherein the step of establishing the repository further comprises defining a retention policy for each business document and generating an input form based on the identifier associated with each business document.

\* \* \* \* \*